United States Patent [19]

Scherrinsky

[11] Patent Number: 4,502,242

[45] Date of Patent: Mar. 5, 1985

[54] POLE-MOUNTED BAIT AND TRAP ATTACHMENT

[76] Inventor: Elmer D. Scherrinsky, R.R. #1, Greenup, Ill. 62428

[21] Appl. No.: 428,343

[22] Filed: Sep. 29, 1982

[51] Int. Cl.³ .......................................... A01M 23/00
[52] U.S. Cl. .................................................... 43/96
[58] Field of Search ..................... 43/96; 248/225.3 R, 248/225.31, 230, 218.4

[56] References Cited

U.S. PATENT DOCUMENTS

| 965,158 | 7/1910 | Cowles | 248/230 |
| 1,083,086 | 12/1913 | Green | 43/96 |
| 1,201,427 | 10/1916 | Angvick | 43/96 |
| 1,409,924 | 3/1922 | Byrne | 43/96 |
| 2,388,539 | 11/1945 | Hartman | 43/96 |
| 3,747,259 | 7/1973 | Pellowski | 43/96 |

Primary Examiner—Nicholas P. Godici
Assistant Examiner—Kurt Rowan
Attorney, Agent, or Firm—Richard G. Heywood

[57] ABSTRACT

A pole-mounted bait and trap attachment for use with traps for fur-bearing water animals and having a bait holding portion and a trap holding portion rigidly interconnected with a pole encircling portion, and means for adjustably securing the attachment on a pole-stake.

3 Claims, 5 Drawing Figures

POLE-MOUNTED BAIT AND TRAP ATTACHMENT

BACKGROUND OF THE INVENTION

The invention pertains generally to animal traps for fur-bearing water animals, and more particularly to a pole-mounted bait and trap attachment device.

A wide variety of traps and trap attachment devices have been designed for the underwater fur-bearing trapping of animals, such as beaver, mink, muskrat and the like. The prior art trap attaching devices generally employ spring clips or clamps and various other relatively movable parts requiring excessive cleaning and maintenance to remove rust and be kept useful. Such devices of the pole-mounted variety, in which traps are supported or suspended from stakes or poles driven vertically into the waterway bed, are disclosed in U.S. Pat. Nos. 1,201,427; 1,409,924; 2,338,539; 3,747,259 and 4,152,861. However, a simple, one-piece attachment device for both bait and trap has not been available heretofore.

SUMMARY OF THE INVENTION

The invention is embodied in a unitary, one-piece bait and trap attachment of the pole-mounted type for water animal trapping, and including a bait holding member and a trap holding member integrally formed with a pole encircling central body portion, and means for vertically adjusting and securing said attachment on a pole.

The principal object of the present invention is to provide a unitary device for holding a water animal trap and the bait therefor.

Another object is to provide a bait and trap attachment device that is vertically adjustable on a pole-stake to accomodate varying water level fluctuations.

A further object is to provide a bait and trap attachment for water animal traps that is simple, strong, durable and inexpensive, and which requires a minimum of maintenance to be kept useful and reliable over a long period of time.

These and still other objects and advantages will become readily apparent hereinafter.

BRIEF DESCRIPTION OF THE DRAWINGS

In the accompanying drawings which illustrate preferred embodiments of the present invention, and wherein like numerals refer to like parts wherever they occur.

DESCRIPTION OF THE PREFERRED EMBODIMENTS

Figure 1:
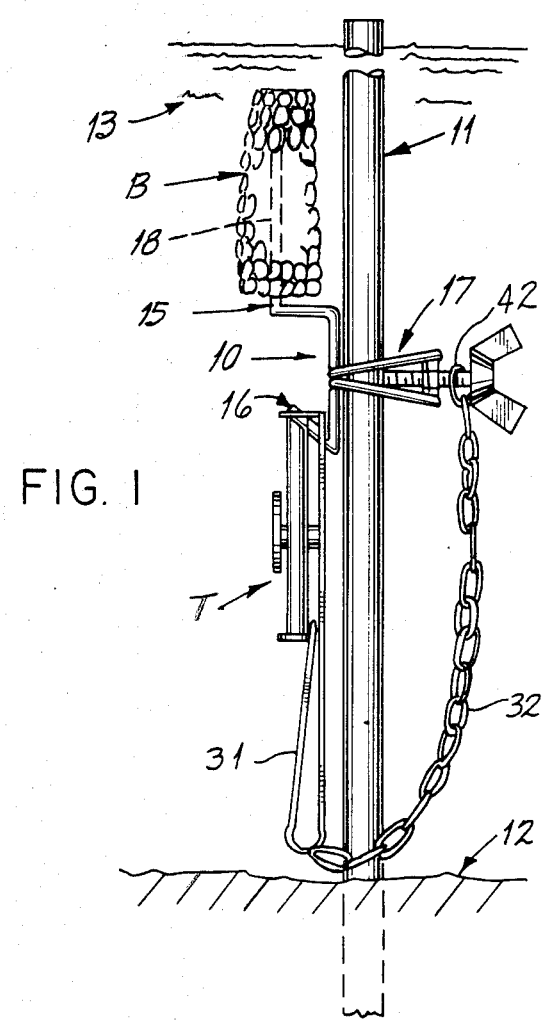
FIG. 1 is a side elevation view showing a bait and trap attachment device of the present invention environmentally secured to a vertical pole.

Referring now to FIG. 1 of the drawings, the bait and trap attachment 10 of the present invention is mounted on a vertical pole or stake 11 driven in an upright position in the bed 12 of a stream or other body of water 13. The pole-stake 11 is shown to be cylindrical, but any cross-sectional configuration is acceptable.

Figure 2:
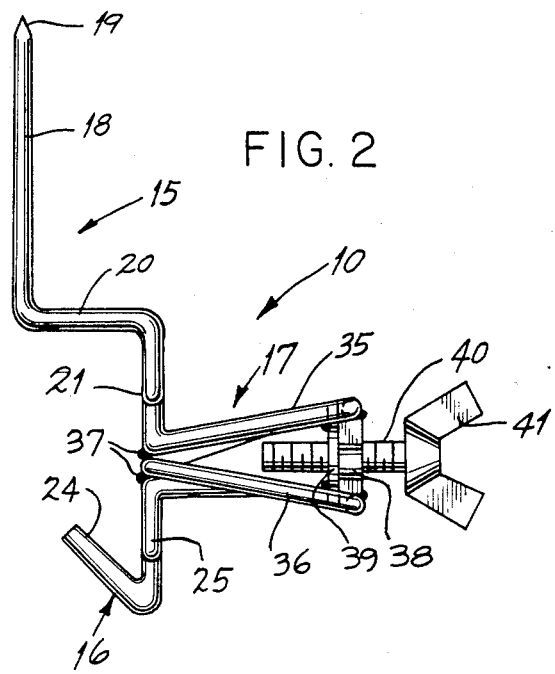
FIG. 2 is an enlarged side elevational view showing one embodiment of a bait and trap attachment.
Figure 3:
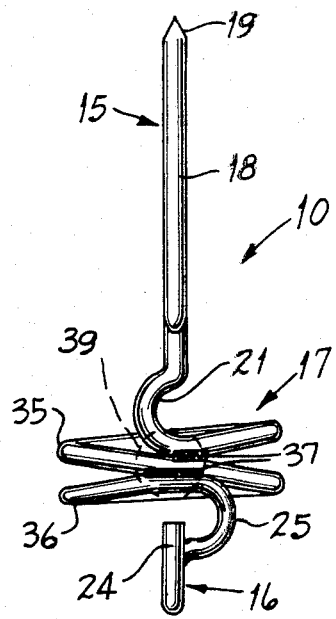
FIG. 3 is an enlarged front elevational view of the FIG. 2 embodiment.

In the embodiment shown in FIGS. 1–3, the attachment device 10 is preferably formed from a unitary, one-piece rod stock or heavy wire to include a bait holding member portion 15 and a trap holding member portion 16, which are integrally connected by a central, pole encircling body or member portion 17. The bait holding portion 15 comprises a vertical spear or prong 18 having an upward pointed end 19 for piercing and skewering the bait B, such as an ear of corn. The lower end of the spear 18 is connected to a horizontal arm 20 to position the spear 18 in an offset spaced relation to the pole 11. The arm 20 of the bait holding portion 15 connects to the central body member 17, preferably by a reentrant bend 21 which abuts against the pole and strengthens and rigidifies the bait holder 15 on the central body 17.

The trap holding portion 16 comprises a angular hook 24 extending downwardly and outwardly below the central body member 17 and being connected thereto by a reentrant bend portion 25 in substantially the same vertical plane as the bend 21 abutting the pole 11. As shown in FIG. 1, the trap hook 24 is provided to support and position an animal trap T in depending relation therefrom by projecting through an aperature (not shown) provided in the trap bed 30 or like frame member of the trap T. It will be understood that the present invention does not pertain to the details of the animal trap per se, and known conventional traps either have or can be readily modified to provide such an aperature. It will also be noted that such conventional traps T are usually provided with a chain clip 31 and a keeper chain 32, which is attached to the attachment device 10 in a manner to be described.

The central body portion 17 of the attachment device 10 comprises a pair of upper and lower pole encircling rings 35 and 36 of substantially the same size and being continuous between the reentrant bends 21 and 25 in the nature of helical turns. However, the coil segments in the plane of the bends 21 and 25 are brought close together and welded, as at 37, to form an integral direct connection between the bait and trap holding members 15 and 16 and add rigidity and strength thereto. The portions of the rings 35 and 36 extending away from the bait and trap members 15 and 16 are diverent and held in rigid spaced apart relation by a spacer lug or flanged nut 38 having an interior facing plate or washer and which is welded or otherwise rigidly attached to both rings 35 and 36. Therefore, the pole encircling member 17 is rigidified at diametrically opposite sides. The spacer lug or flanged nut 38 (and its integral washer element 39) are threadedly bore to receive a set screw or bolt 40 having a winged head 41 whereby the attachment device 10 can be vertically adjusted on the pole-stake 11 to a selected elevation appropriate for the water level and the threaded fastener 40, 41 is then tightened against the pole 11 to releasably secure the device 10 in such selected location. As seen in FIG. 1, a link or ring end 42 of the trap keeper chain 32 is positioned over the bolt 40 and retained thereon by the winged head 41 to tether the attachment device 10 and trap T together and, in turn, the pole encircling body 17 prevents dislodgement from the pole 11.

Figure 5:
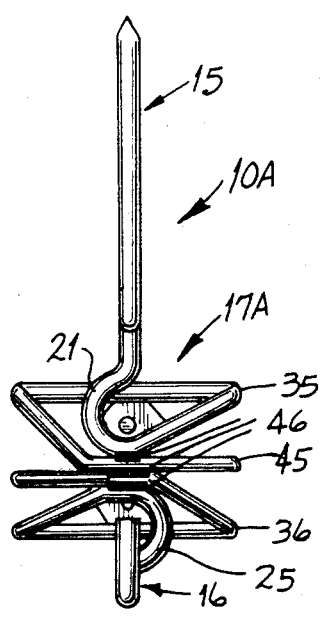
FIG. 5 is an enlarged front elevational view of the FIG. 4 embodiment.
Figure 4:
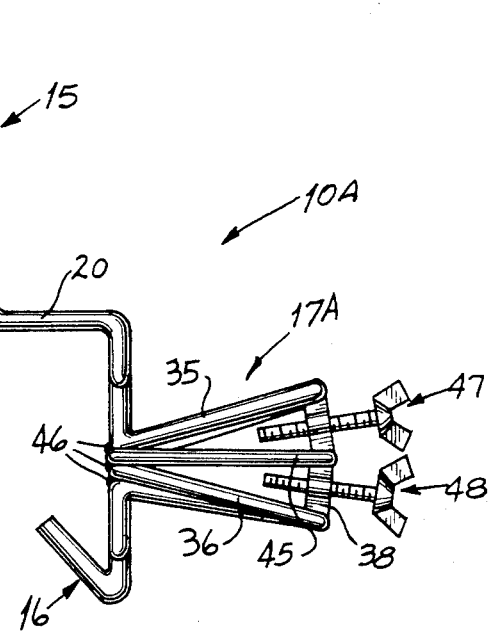
FIG. 4 is an enlarged side elevational view showing another embodiment of the bait and trap attachment device.

Referring now to the other embodiment shown in FIGS. 4 and 5, this form of bait and trap attachment device 10 A has a central body member 17 A with an additional center ring member 45 disposed between and helically formed with the upper and lower rings 35 and 36. The rings are welded, as at 46, on the bait and trap holder side thereof, and are spaced by and welded to multiple fastener means 47 and 48 similar to the winged bolt 40, 41 of FIGS. 2 and 3.

It will be apparent that the one-piece wire or rod stock, from which the attachment device 10 is formed, can be bent into other ring configurations than circular rings 35, 36, 45 and the reentrant bends 21, 25 may be eliminated or modified so as to adjust the distance between the bait B and trap T. These and still other changes and modifications will be readily apparent to those skilled in the art.

What I claim is:

1. A pole-mounted bait and trap attachment adapted for use in combination with traps for fur-bearing water animals, comprising an attachment member having a bait holding portion, a trap holding portion and a pole encircling portion which said portions are formed from one-piece rod stock and rigidly interconnected as an integral unit, said bait holding portion comprising a spear member projecting upwardly above said pole encircling portion and said trap holding portion being positioned below said bait holding portion and comprising hook means adapted to hold an animal trap in suspended, depending relation therefrom, said pole encircling portion being convoluted and forming ring means comprising a pair of continuously and helically formed rings rigidly joined together in abutting relation on one side for single pole engaging contact and said rings diverging away from each other from said one side into spaced relation on the opposite side to form vertically spaced-apart, dual pole engaging contacts, said ring means being adapted to be positioned in circumscribing relation around a pole-stake with said single contact and dual contacts of said ring means being engaged on opposite sides of said pole-stake, said bait and trap holding portions being substantially vertically aligned on said single contact side of said ring means, and pole securing means attached to said dual contact side of said ring means and being adapted for releasably and adjustably securing said attachment member to the pole-stake.

2. The bait and trap attachment according to claim 1, including means for spacing said spear member horizontally away from said one side of said ring means, and at least one of said bait and trap holding portions being connected to said pole encircling portion by an intermediate re-entrant bend.

3. The bait and trap attachment according to claim 1, in which said pole securing means also includes a spacer lug positioned between and rigidly joined to said rings on said spaced-apart opposite side, and winged bolt means threadedly adjustably in said spacer lug toward said one side and a pole-stake securing engagement.

* * * * *